(12) United States Patent
Sams et al.

(10) Patent No.: US 6,176,225 B1
(45) Date of Patent: Jan. 23, 2001

(54) INJECTION SYSTEM

(75) Inventors: Theodor Sams, Graz; Herwig Ofner, Stübing, both of (AT)

(73) Assignee: AVL List GmbH, Graz (AT)

( * ) Notice: Under 35 U.S.C. 154(b), the term of this patent shall be extended for 0 days.

(21) Appl. No.: 09/324,863

(22) Filed: Jun. 3, 1999

(30) Foreign Application Priority Data

Jun. 5, 1998 (AT) .................................................. 380/98 U

(51) Int. Cl.$^7$ .................................................. F02M 21/02
(52) U.S. Cl. ........................................... 123/549; 123/514
(58) Field of Search .................... 123/549, 557, 123/514, 543, 276 E

(56) References Cited

U.S. PATENT DOCUMENTS

| | | | |
|---|---|---|---|
| 4,147,142 | * | 4/1979 | Little et al. .......................... 123/557 |
| 4,216,751 | * | 8/1980 | Davison et al. ...................... 123/557 |
| 4,688,537 | * | 8/1987 | Calkins et al. ....................... 123/557 |
| 4,742,801 | * | 5/1988 | Kelgard ............................ 123/27 GE |
| 5,329,908 | | 7/1994 | Tarr et al. . |
| 5,542,398 | * | 8/1996 | Marcon ................................ 123/527 |

FOREIGN PATENT DOCUMENTS

| | | |
|---|---|---|
| 001924 | 1/1998 | (AT) . |
| 3523855 | 1/1987 | (DE) . |
| 19611434 | 12/1996 | (DE) . |

* cited by examiner

*Primary Examiner*—Marguerite McMahon
(74) *Attorney, Agent, or Firm*—Dykema Gossett PLLC

(57) ABSTRACT

The present invention relates to an injection system for an internal combustion engine operating on self-igniting, liquefied petroleum gas and including at least one injector per cylinder for direct fuel injection into the combustion chamber, a fuel tank in which fuel is held at a feed pressure, and a high-pressure fuel pump delivering fuel to the injector, the pressurized parts of the injector system being connected with the fuel tank by means of pressure relief lines. In order to ensure safe operation in a simple manner the proposal is put forward that a heating device should be provided which will convert the liquefied gas, at least partially, into a gaseous phase, at least in certain sections of the pressurized parts of the injection system. The gas bubble produced during this process will convey the liquid phase of the liquefied petroleum gas into the fuel tank.

11 Claims, 1 Drawing Sheet

INJECTION SYSTEM

BACKGROUND OF THE INVENTION

The invention relates to an injection system for an internal combustion engine operating on self-igniting liquefied petroleum gas and including at least one injector per cylinder for direct fuel injection into the combustion chamber, with a fuel tank in which fuel is held at a freed pressure, and a high-pressure fuel pump delivering fuel to the injector, and a shutdown device enabling connection of pressurized parts of the injection system to the fuel tank by way of at least one pressure relief line.

DESCRIPTION OF THE PRIOR ART

Conventional injection systems are designed for injecting either self-igniting of extraneously ignited liquid fuels. Under conditions of ambient pressure and ambient temperature such fuels are supplied in liquid form; as a consequence the storage tank is unpressurized. Usually the liquid fuel is simultaneously employed as a lubricant for movable parts of the injection system. For this reason provisions are made for leakages and oil leakage pipes leading back to the tank.

In DE 35 23 855 A1 a method is described for operation of an internal combustion engine using a cracked gas obtained from methanol and air. Methanol is usually stored in depressurized condition in conventional storage tanks. The cracked gas, which is also known as synthesis gas and consists of hydrogen and carbon monoxide, is produced in a gas producer at the pressure required for injection, which is in the range at 80 to 100 bar. The cracked gas is ignited either by a spark or another ignitable fuel, such as diesel. Cracked gas is not a self-igniting, liquefied petroleum gas. It is not directly injected into the combustion chamber of the engine but blown in indirectly at high pressure. Such an injection system cannot be used for direct injection of a self-igniting, liquefied petroleum gas in an internal combustion engine operating on liquefied petroleum gas.

Another known type of fuel used in this context is a liquefied petroleum gas stored under pressure. Russian Abstract SU 1040-206-A (Soviet Inventions Illustrated, Q53, 1988) describes a gas-operated internal combustion engine with a fuel tank for liquefied petroleum gas, i.e., butane, which is pressurized by means of another compressed gas, i.e., methane. Conventional liquefied petroleum gases such as propane or butane are fuels whose ignition is effected by outside means and which are introduced into the combustion chamber as gases premixed with air (fuel for use with SI engines).

Newly developed liquefied gas fuels with high cetane number, such as dimethyl ether, have a vapor pressure or less than 30 bar at ambient temperature and can be used as self-igniting fuels. If such liquefied gases are used in conventional diesel injection systems, the danger of cavitation will rise on account of the high vapor pressure of such fuels, in particular in regions of local pressure drop, which will lead to fuel delivery problems and increased wear.

Since self-igniting, liquefied petroleum gas fuels evaporate under normal ambient conditions and since they can form an ignitable or explosive mixture together with air, the fuel must be prevented from leaking out into the environment under all circumstances. This is rendered difficult by the high permanent pressure that must be maintained in the system to keep the fuel in its liquid state. Especially after engine shutdown the internal pressure prevailing in the injection system represents a certain safety risk in the instances of leakages, no matter how small they are.

In DE 196 11 434 A1 an injection system of the above type is presented, in which at least one pressurized part of the injection system can be depressurized by means of a shutdown device. The shutdown device includes a collecting tank into which pressure relief lines are guided from the pressurized parts. The collecting tank is connected to the fuel tank by means of a valve and a pumping device. After the engine has been turned off the first valve positioned between the low-pressure storage tank and the fuel pump is shut and the second valve positioned between the pressurized parts and the collecting tank is opened. As a consequence the liquid fuel remaining in the system is drained into the collecting tank and gasified at low pressure. The pumping device compresses the gas and forces it back into the low-pressure storage tank, thus liquefying it again. Because of the additional collecting tank this known shutdown device requires some constructional efforts.

A similar injection system is also described in AT 001 924 U2, which includes a purge tank, i.e., an unpressurized reservoir into which the fuel from hugh-pressure parts of the injection system is drained after the engine has been turned off. By means of a low-pressure pump and a check valve the fuel is returned into the fuel tank once more. As regards construction volume and control this system again is fairly complex.

SUMMARY OF THE INVENTION

It is an object of the invention to avoid previous disadvantages and to further develop an injection system for self-igniting liquid furls as described above, which will ensure high safety in a simple manner.

According to the invention this object is achieved by providing at least one heating device, which will convert the liquefied petroleum gas, at least partially, into a gaseous phase, at least in section of pressurized parts of the injection system. It is provided in this context that a flow connection be established between at least one pressurized part of the injection system and the fuel tank after the fuel pump is turned off, and that in the pressurized part the liquefied petroleum gas be converted, at least partially, into a gaseous phase by heating it, at least in sections, such that a gas bubble will form, which will push the remaining liquefied gas from the pressurized part into the fuel tank, and that preferably the flow connection between the pressurized parts and the fuel tank be interrupted and, in particular, pressurized parts of the injection system be cooled.

Upon engine shutdown the liquid fuel is returned from the injection system into the fuel tank in which the fuel is kept in the boiling state. As the fuel in the tank is kept boiling the pressure equalization will not suffice to remove the entire amount of liquid fuel from the injection system. Due to the proposed heating of pressurized parts the fuel will partly evaporate such that at least one gas bubble will form, which is retained in the closed system. The injection system should be designed such that the gas bubble will form at a point which is furthest remote from the return line into the fuel tank. Since the gas cannot escape the pressure in the system is increased and the pressure rise is employed to force out the liquid fuel from the pressurized parts into the fuel tank.

It is provided in a preferred variant of the invention that the heating device be used to carry waste heat from the internal combustion engine to pressurized parts of the injection system. The heating of pressurized parts of the injection system may be effected by selectively improving the heat transfer between the engine casing, for example, the cylinder block of the engine and certain parts of the injection system.

Such efforts may include the use of heat bridges between the engine block and pressurized parts.

In another preferred variant of the invention the proposal is put forward that the heating device be connected to the cooling system of the internal combustion engine. If the engine is at operating temperature it will produce sufficient waste heat for the fuel to form a gaseous phase in high-pressure parts of the system, thus forcing the fuel into the fuel tank.

In further development of the invention it is preferred that the heating device be configured as external heating, preferably an electrical heater. This will permit safety requirements to be fulfilled and pressurized parts of the injection system to be drained even if the engine is shut down in the cold state and at low ambient temperature.

It has proved an advantage if heat from the heating device is applied to pressurized parts in the region of the injector. In case of injection systems with injectors in which the closing force of the needle is applied by a spring in a spring chamber, it has been found most advantageous if the heating device can be used to heat the spring chamber of the injector. As soon as the liquid phase of the fuel has been removed from the injection system the latter is allowed to cool. If the return line contains a check valve or a controlled valve, which will prevent the fuel from flowing back from the fuel tank into the injection system, and if the remaining gas is heated above boiling temperature, the cooling process will reduce the pressure in the injection system. If desired, it may be provided that at least one cooling device be provided in at least one return line under feed pressure and/or in high-pressure parts of the injection system. The cooling device may be a blower or fan.

The main advantages of the invention are

1) By removing (at least almost) the entire amount of liquid fuel from the injection system only a small mass of fuel will remain in the system after expulsion due to the low density of the gaseous phase. As a consequence, only a small amount of fuel can escape into the environment or the combustion chamber of the engine in the instance of leaks.

2) The pressure decrease in the injection system resulting from the cooling pressure will further reduce leakage flow in case of leaks in the system.

BRIEF DESCRIPTION OF THE DRAWINGS

The invention will now be further described with reference to the accompanying drawings, in which.

DETAILED DESCRIPTION OF PREFERRED EMBODIMENTS

Figure 1:
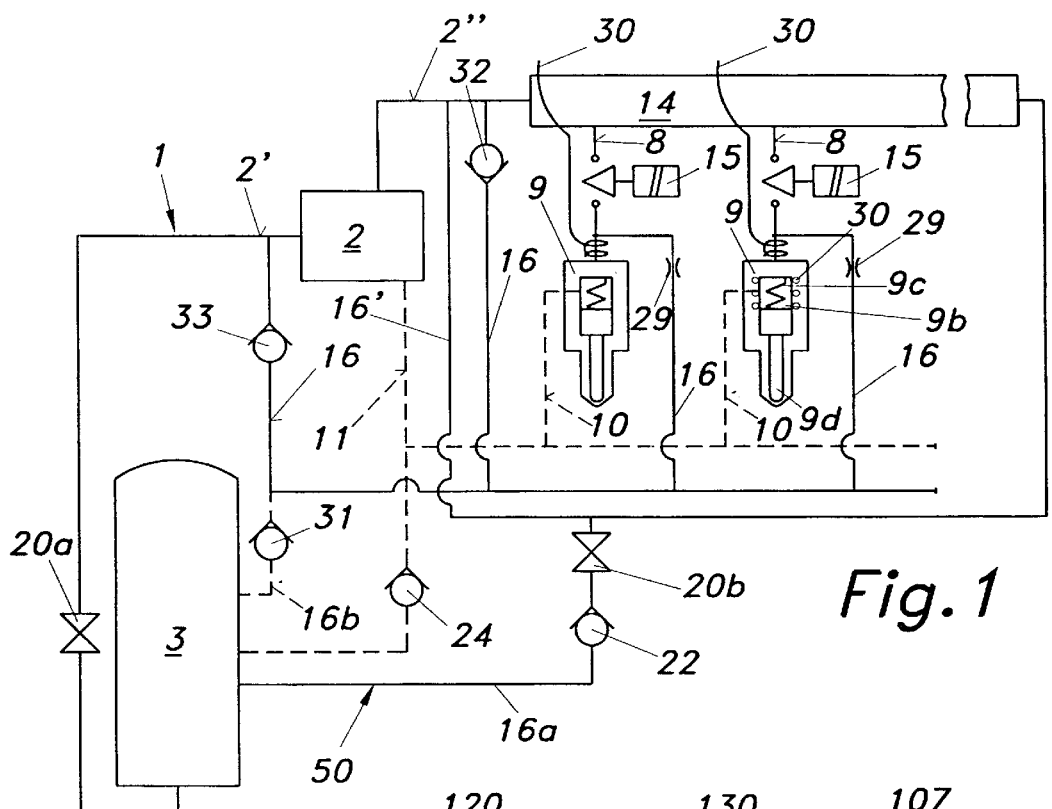
FIGS. 1 and 2 show schematic variants of injection systems in accordance with the present invention.

FIG. 1 shows an injection system 1 according to the invention, for direct injection of liquefied petroleum gas. The high-pressure fuel pump 2 delivers the liquid fuel via a high-pressure distributor tank 14 and high-pressure lines 8 to the individual injectors 9. The pressure in the high-pressure distributor tank 14 may amount to 200 bar, for example. Due to the properties of the liquefied petroleum gas used there will be no need for higher pressures usually. In the injection lines 8 leading from the high-pressure distributor tank 14 to the injectors 9, injection control valves 15 are provided which are actuated by means of a control unit not shown in this drawing. The injection control valves 15 may also be integrated in the injectors 9.

Pressurized parts of the injection system 1, such as the suction line 2' and the pressure line 2" of the high-pressure fuel pump 2, as well as the injection lines 8 can be depressurized via pressure relief lines 16, 16a, 16b, 16' of a shutdown device 50. The shutdown device 50 includes one or several heating devices 30 by means of which the temperature of the pressurized parts of the injection system 1 can be increased, at least in sections. The shutdown device 50 further comprises a first and second shutdown valve, 20a and 20b.

After the engine has been turned off the first shutdown valve 20a is shut, then the second shutdown valve 20 b is opened and the remaining fuel in the system is drained into the fuel tank 3 configured as a low-pressure tank, until pressure equalization is established between the fuel tank 3 and the pressurized parts. Fuel expulsion from pressurized parts of the injection system 1 is considerably improved by heating the high-pressure parts of the injection system 1, at least in sections, by means of a heating device 30, until the temperature has risen to a level at which the remaining fuel in the system 1 will evaporate and a gaseous phase will form in addition to the liquid phase. As the injection system 1 at rest is a closed system the gas bubble cannot escape from the system. The design of the system and the position of the heating device 30 should be chosen such that the gas bubble will form at a point which is as remote as possible from the return line into the fuel tank 3. Since the gaseous phase of the fuel cannot escape the pressure in the injection system 1 will increase and the pressure rise is utilized to push out the liquid fuel into the fuel tank 3 by way of the relief lines 16, 16', 16a, 16b. If the gas bubble forms at a place far away from the relief lines 16, 16', 16a, 16b, it is mainly the liquid phase of the fuel that is pushed into the fuel tank 3. The heating device 30 may be provided in the region of the spring chamber 9b of the injector 9, where the closing spring 9c for the needle 9d is located.

As soon as the liquid fuel phase has been removed from the pressurized parts of the injection system 1 and the remaining gas has preferably been heated above boiling point, the gas is allowed to cook down. If a check valve 22 or a shutdown valve 20b is located in the return line 16, which valve will prevent the fuel from flowing back from the fuel tank 3 into pressurized parts of the injection system 1, the pressure in the injection system 2 will be further reduced by the subsequent cooling pressure.

Further functional check valves have the reference numbers 31, 32, and 33.

If the high-pressure fuel pump 2 and the injectors 9 are constituted by conventional parts with fuel return lines 10, 11, the latter may be connected to the fuel tank 3, possibly by a check valve 24, as indicated in FIG. 1 by broken lines. This wall provide a closed fuel system using elements of conventional diesel injection systems.

Figure 2:
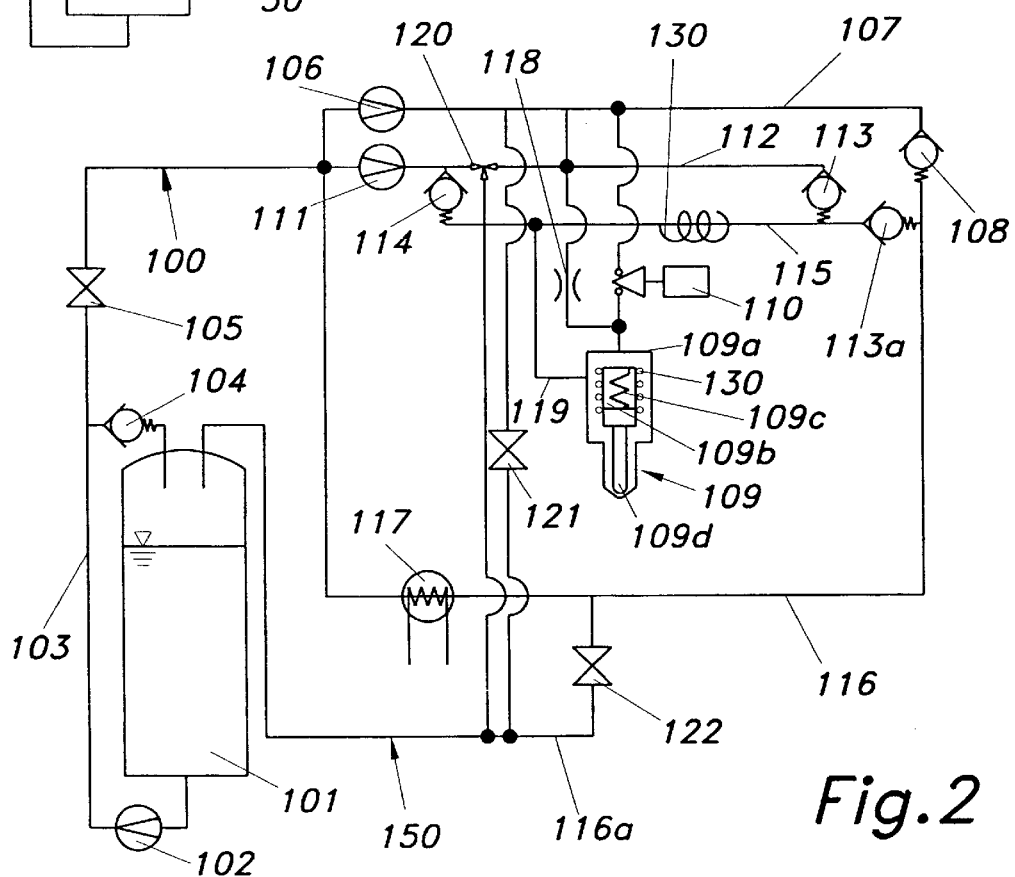

In the variant of FIG. 2 fuel is provided in a fuel tank 101 configured as a low-pressure tank. A low-pressure fuel pump 102 delivers fuel to a supply line 103 which is maintained at a pressure of about 3 to 10 bar above the vapor pressure in the fuel tank 101 by a pressure limiting valve 4. A regulating valve 5 permits regulation of the fuel supply. A high-pressure fuel pump 106 delivers fuel to a high-pressure line 107 in which fuel is held at a pressure of about 250 bar. A pressure limiting valve 108 regulates this fuel pressure, which constitutes the injection at the same time. FIG. 2 shows in an exemplary manner a single injector 109. It is understood, though, that several such injectors 109 are placed side by side, corresponding to the number of cylinders in the internal combustion engine. For each injector 109 an injection control valve 110 is provided, which is configured as an electromagnetically actuated valve. During the injection process this injection control valve 110 opens in order to supply the fuel supply connection 109*a* of the injector 109 with fuel under injection pressure. Moreover, a medium-pressure fuel pump 111 is in connection with the supply line 103, which pump supplies a control line 112 with fuel at a pressure of approximately 30 bar. A pressure limiting valve 113 is used for adjusting the control pressure. If desired, the pressure limiting valve 113 may be configured as a controlled valve in order to enable the control pressure to be adjusted depending on the respective requirements. A further pressure limiting valve 114 is used for supplying a circulation line 115 with fuel. The circulation line 115 is in connection with a return line 116 in which a fuel cooler 117 is located. Downstream of the cooler 117 the return line 116 opens into the supply line 103.

The fuel supply connection 109*a* of the injector 109 is connected to the control line 112 via a throttle 118. When no injection takes place, the pressure in the injector 109 may be reduced to control pressure level by way of the throttle 118. A return line 119 of the fuel injector 109 is in connection with the circulation line 115.

A three-way valve 120 is used on the one hand for regulation of the fuel flow through the control line 112 and the circulation line 115, and on the other hand to enable a pressure relief in the control line 112 during an engine standstill. A relief valve 121 serves for pressure relief in the high-pressure line 107 and a relief valve 122 for pressure relief in the return line 116. These valves 120, 121, 122 will permit depressurization of the entire fuel system upon engine shutdown. The fuel is drained via these valves 120, 121, 122 into the fuel tank 101. In analogy to the variant shown in FIG. 1, the temperature of certain pressurized parts of the injection system 100 is raised by means of a heating device 130 until the fuel will partially evaporate, Thus producing furl vapor bubbles. The fuel vapor bubbles will initiate a pressure rise and push back the remaining fuel in the injection system 100 into the fuel tank 101 via the relief line 116*a*.

The shutdown device 150 and the injection system 100 should be configured so as to facilitate emptying those parts of the system which are particularly critical with regard to leakage, such as the injectors 109.

In the variant shown in FIG. 2 the injector 109 together with the injection control valve 110, the pressure limiting valves 113, 113*a*, 114, and three-way valve 120 form a partial system which can be drained separately via the relief line 116*a*. In this instance the circulation line 115 is heated preferably, such that the fluid is expelled via the return line 119, the spring chamber 109*b* of the injector containing the closing spring 109*c* for the 109*d*, along the gaps of the needle guide (no reference number) of needle 109*d*, the nozzle chamber, the throttle 118, and the three-way valve 120, into the fuel tank 101.

The fuel lines 107, 112, 115 are configured as bores in a common distributor rail. This will permit a thorough temperature exchange between the fuel in the high-pressure line 107 and the fuel in the control line 112 and the circulation line 115. As a result, the fuel heated by the high-pressure fuel pump 106 is cooled effectively. It would principally be possible during operation to return the fuel from the return line 116 via the relief line 116*a* directly to the storage tank 101 in order to achieve a thorough mixing with the fuel in the tank. By providing the cooler 117, the fuel from the return line 116 can be cooled effectively however, and supplied directly to the high-pressure pump 106 or medium-pressure pump 111. The fuel quantity delivered by the medium-pressure pump 111 is chosen such that an excess amount of fuel is delivered into the control line 112. By suitably adjusting the pressure limiting valves 113 and 114 a permanent flow through the circulation line 115 is achieved in the same way. In this manner the entire system can be cooled more effectively during operation of the engine.

In both variants of the invention energy for heating the fuel may be drawn from the engine if required, for example via the cooling water, when the system is drained after a prolonged period of engine operation. If the injection system must be drained when the engine is still cold, the heating device 30, 130 should preferably be constituted by an external unit, for example, an electrical heater, where external energy is supplied, for instance via the battery.

The preheating of pressurized parts will permit removal of almost the entire amount of liquid fuel from the injection system 1. As a consequence, only gaseous fuel components can escape from the system into the environment of the combustion chamber of the engine in the instance of leakages. Because of the low density of the gaseous phase only a small fuel mass will thus be involved. Moreover, the subsequent cooling process will have favourable effects on the pressure decrease in the injection system 1 and will also reduce the leakage flow in case of leaks.

What is claimed is:

1. An injection system for an internal combustion engine operating on self-igniting liquefied petroleum gas and including at least one injector per cylinder for direct fuel injection into the combustion chamber, with a fuel tank in which fuel is held at a feed pressure, and a high-pressure fuel pump delivering fuel to the injector and a shutdown device enabling connection of pressurized parts of the injection system to the fuel tank by way of at least one pressure relief line wherein at least one heating device is provided which will convert the liquefied petroleum gas at least partially into a gaseous phase, at least in sections of pressurized parts of the injection system.

2. An injection system according to claim 1, wherein the heating device carries waste heat from the internal combustion engine to pressurized parts of the injection system.

3. An injection system according to claim 1, wherein the heating device is connected to a cooling system of the internal combustion engine.

4. An injection system according to claim 1, wherein the heating device is configured as external heating.

5. An injection system according to claim 4, wherein the external heating is an electrical heater.

6. An injection system according to claim 1, wherein the heating device applies heat to pressurized parts in the region of the injector.

7. An injection system according to claim 6, with at least one injector being provided with a spring chamber in which is located a closing spring acting on a needle, wherein the heating device will heat the spring chamber of the injector.

8. An injection system according to claim 1, wherein at least one cooling device is provided in at least one return line under feed pressure.

9. An injection system according to claim 1, wherein at least one cooling device is provided in high-pressure parts of the injection system.

10. A method for depressurization of an injection system for an internal combustion engine operating on liquefied petroleum gas, wherein a flow connection is established between at least one pressurized part of an injection system and a fuel tank after a high-pressure fuel pump is turned off, and wherein, in the pressurized part the liquefied petroleum gas is converted, at least partially, into a gaseous phase by heating it, at least in sections, such that a gas bubble will form, which will push the remaining liquefied gas from the pressurized part into the fuel tank.

11. A method according to claim 10, wherein the flow connection between pressurized parts and the fuel tank is interrupted and, in particular, pressurized parts of the injection system are cooled.

* * * * *